2,530,503

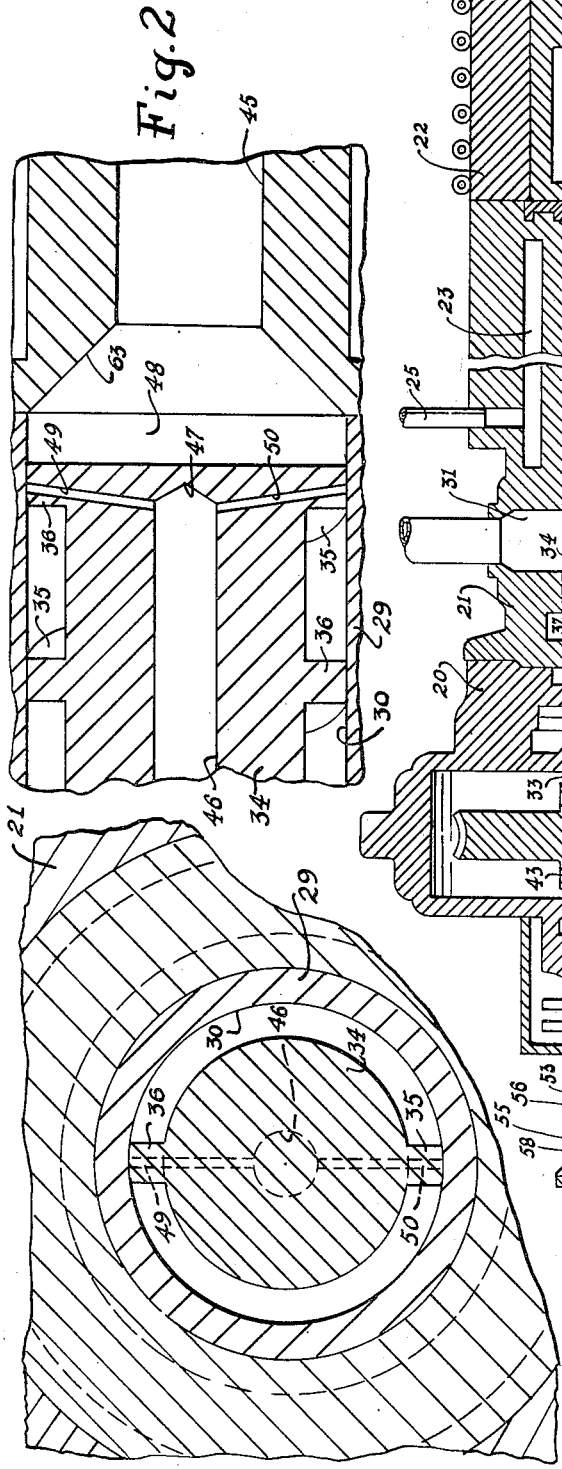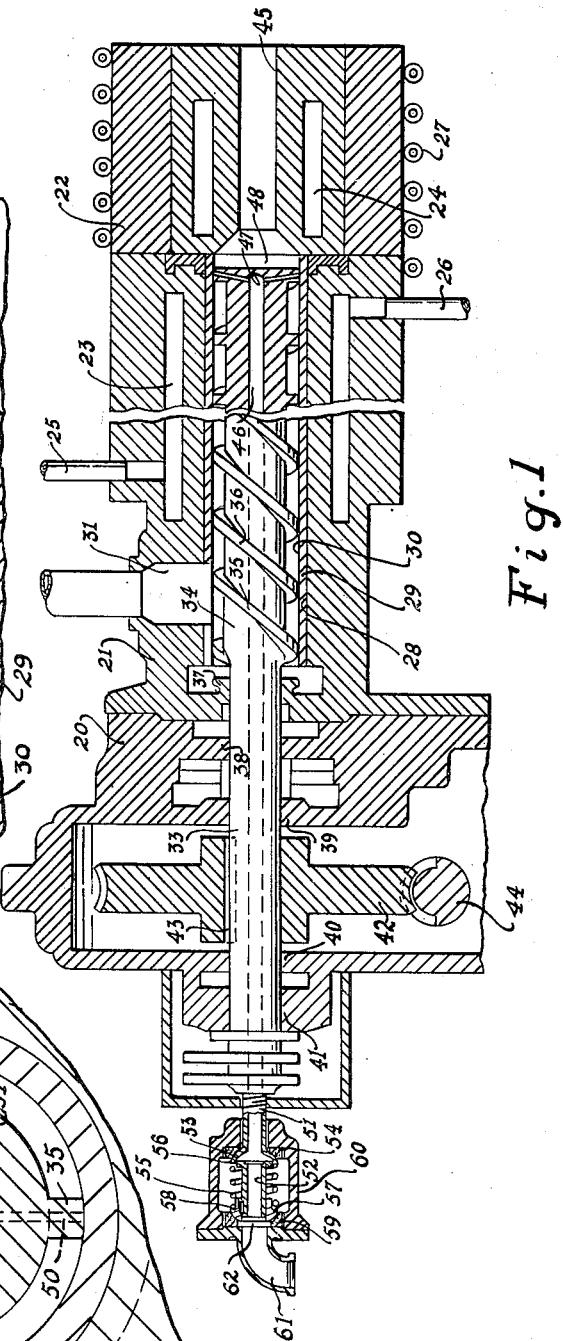
Nov. 21, 1950 — W. H. BONHAM — 2,530,503
CONTINUOUS EXTRUSION MACHINE
Filed Aug. 2, 1947 — 2 Sheets-Sheet 1
INVENTOR.
WILLIAM H. BONHAM
BY Des Jardins & Compton
His ATTORNEYS Nov. 21, 1950 W. H. BONHAM 2,530,503
CONTINUOUS EXTRUSION MACHINE
Filed Aug. 2, 1947 2 Sheets-Sheet 2
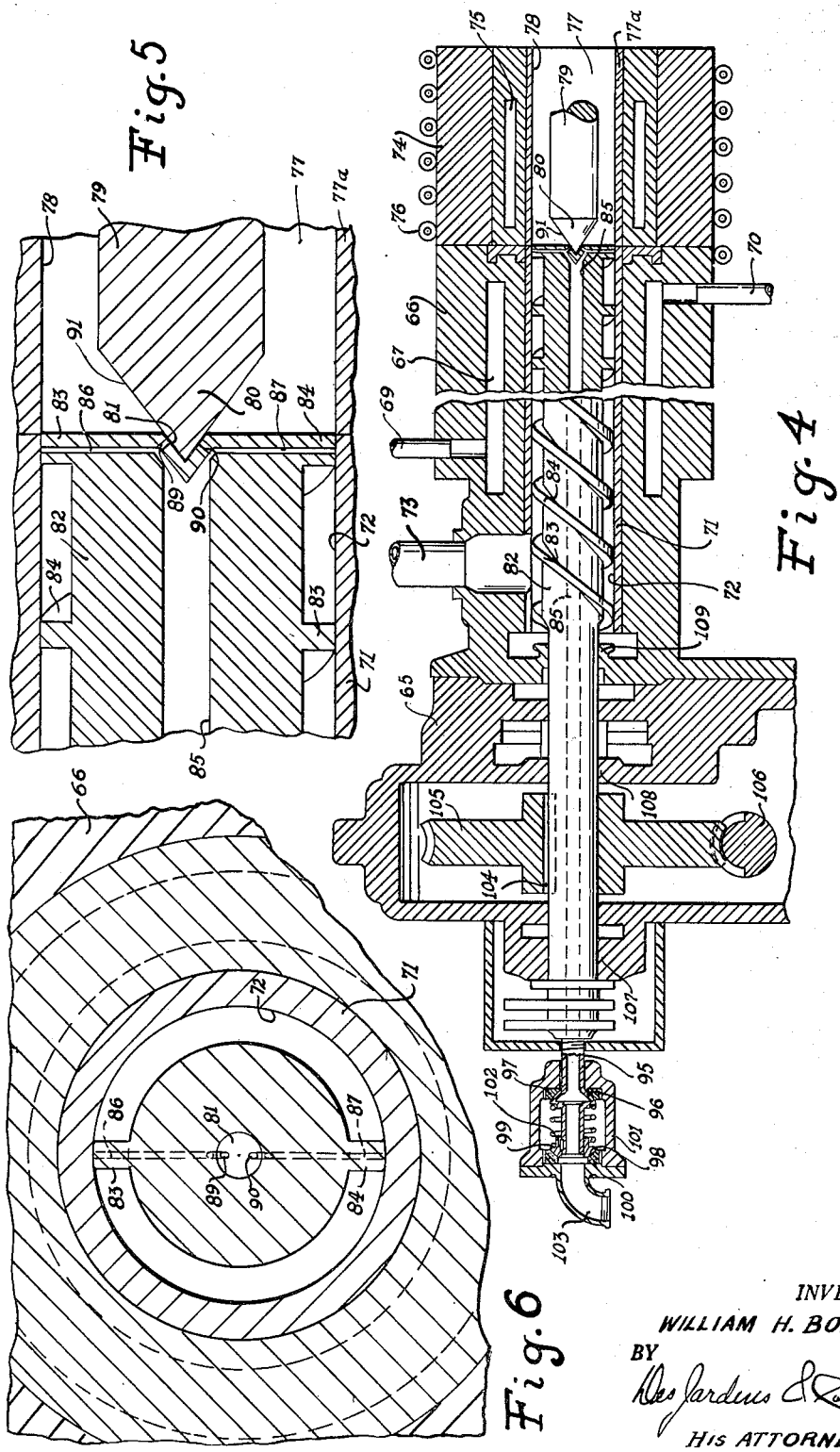
INVENTOR.
WILLIAM H. BONHAM
BY
His ATTORNEYS Patented Nov. 21, 1950

UNITED STATES PATENT OFFICE 2,530,503

CONTINUOUS EXTRUSION MACHINE

William H. Bonham, Metuchen, N. J., assignor to Nixon Nitration Works, Nixon, N. J., a corporation of New Jersey Application August 2, 1947, Serial No. 765,721

11 Claims. (Cl. 18—12)

This invention relates to a continuous extrusion machine, of the screw-conveyor type, having means for delivering lubricants through the screw, under pressure, as it is rotating, to orifices at the delivery end of the screw, said orifices being so situated as to wipe lubricant onto the delivery surfaces of the cylinder or die portions of the machine to prevent sticking of the delivered extrusion material thereto.

Many attempts have been made, in the past, to solve the problem of the sticking of extruded materials to the walls of the delivery end of a continuous screw-conveyor type of extruder as the material is being forced out of the extruder. Efforts have been made to lubricate the surfaces with solid or liquid lubricant material, introduced thereto in various ways, but all have failed of complete success because of the difficulty of controlling the introduction of the lubricant to all of the necessary surfaces in the proper amounts.

In my novel machine, I introduce fluid lubricants, such as oil, through an axial passageway, from the rear or loading end of the screw to the delivery end thereof. This passageway ends in orifices which wipe the delivery surfaces of the extrusion cylinder and the die surfaces. The oil is smeared on the surfaces by the rotary motion of the screw so that the film of lubricant is continuously applied to all the delivery surfaces equally, to replace that carried away by the extruded material.

In one form of the invention, I have applied the novel structure to a machine for the continuous extrusion of solid bodies, such as rods, and in another form I have applied the novel structure to a machine for the continuous extrusion of hollow forms, such as tubes to be used as tubes or to be split into sheeting.

Although the invention is applicable to all forms of continuous screw-conveyor extrusion machines benefited by lubrication of the cylinder and die surfaces, and to all kinds of extrusion materials, I disclose, as a preferred embodiment of my invention, a machine for the extrusion of rods or tubes made of thermoplastic material.

Therefore, the principal object of my invention is to provide a screw-conveyor type of extrusion machine wherein lubricant delivered from orifices at the delivery end of the screw is smeared onto the cylinder wall.

Another object of the invention is to provide such an extrusion machine wherein the conveyor screw smears oil on the presenting surface of a mandrel for forming the inner surface of a hollow extruded object.

Another object of my invention is to provide such an extrusion machine in which the screw smears oil on both the cylinder and the mandrel surfaces.

Another object of my invention is to provide such an extrusion machine wherein provision is made for introducing oil to an axial passageway in the screw from the rear or loading end thereof, under pressure, while the screw is rotating, so that the oil will be forced out of the orifices at the delivery end of the screw and smeared continuously on the delivery walls of the extruder.

Another object of the invention is to provide in such a screw an axial passageway ending short of the delivery end thereof but having branches opening on the cylinder wiping edges of the screw at the delivery end.

Further objects, and economies of construction will definitely appear from the detailed description to follow.

In one instance, I have accomplished the objects of my invention by the devices and means set forth in the following specification. My invention is clearly defined and pointed out in the appended claims. Structures, constituting the preferred embodiment of my invention, are illustrated in the accompanying drawings, forming a part of the specification, in which:

Fig. 1 is a longitudinal section through a portion of a continuous screw-conveyor type of extrusion machine for extruding rods, showing the screw partly in section, the screw being adapted to smear lubricants on the delivery end of the cylinder walls.

Fig. 2 is an enlarged detail of the delivery end of the screw shown in Fig. 1.

Fig. 3 is a vertical section through a portion of the cylinder and screw just forward of the axial passageway in the screw.

Fig. 4 is a longitudinal section through a screw-conveyor type of extrusion machine for extruding tubes, showing a screw adapted for smearing oil on the cylindrical surfaces of the cylinder and also onto the presenting surfaces of a mandrel for forming the inner surfaces of the extruded tubing.

Fig. 5 is an enlarged detail of the delivery end of the screw, in section, with relation to the cylinder walls and the presenting portion of the tube-forming mandrel.

Fig. 6 is a vertical section of part of the delivery end of the cylinder and screw of Fig. 4, just forward of the axial passageway in the screw.

In the specification, the same reference numbers are applied to the same parts, throughout the several views.

Referring to Fig. 1, there is shown a drive housing 20, a cylinder housing 21, and a die housing 22 of a typical extrusion machine, of the type used for extruding thermoplastic materials such as cellulose nitrate and cellulose acetate. Chambers, such as chamber 23 and chamber 24, are provided for the circulation of temperature controlling fluid to be circulated therethrough through pipes, such as pipes 25 and 26 shown in connection with chamber 23. A coil of pipe 27 surrounds the outside of the casing 22, in a typical manner for carrying fluids for further temperature control purposes. Within the cylinder housing or casing 21 is a cylindrical chamber 28 having a cylinder liner 29 of material of the proper hardness, and corrosion resistance necessary to the proper movement of plastic material through it. The inner surface 30 of the cylinder liner 29, which shall hereafter be termed the extrusion cylindrical surface, has an aperture at the rear end, leading to an externally opening loading aperture 31 by which raw molding stock may be introduced into the extrusion cylinder.

A screw-conveyor is provided, comprising a rear shaft portion 33, a front shaft portion 34, extending the length of the extrusion cylinder, on which portion of the shaft is formed a double flighted screw, comprising flights or threads 35 and 36, the edges of said flights or threads being in bearing contact with the surface 30 of the extrusion cylinder so that rotation of the shaft 34, in the proper direction, causes movement of the raw molding material from the rear or loading end of the extrusion cylinder toward the forward or delivery end 48 thereof. The rear end 33 of the shaft is supported in suitable bearings such as bearings 37, 38, 39, 40 and 41, for rotation, through drive gear 42 keyed thereto by key 43. Gear 42 is driven, in turn, by a worm drive shaft 44, in the usual manner.

Extending from the delivery end of the cylinder is an extrusion die orifice 45 into which the delivered plastic material is forced, to issue in the shape determined by the cross sectional shape of said orifice, in this disclosure circular.

As seen in Figs. 1 and 2, the screw conveyor has, longitudinally, on its axis of rotation, a central passageway 46 extending from the rear end of the shaft to a point 47 just short of the end 48 of said conveyor screw. Branching from said passageway 46 (Fig. 2), in diametrical relation, are side passages 49 and 50 which open respectively on the surfaces of flights or threads 36 and 35 which are in contact with the interior cylinder surface 30 at the delivery end of the extrusion cylinder.

As seen in Fig. 1, at the rear end of the shaft, there is screwed therein a nipple 51 having an internal passageway 52 and an external bearing surface 53 of spherical contour which rests against graphite ring 54, dished to receive and be worn into a perfect fit by the surface 53, as it rotates, thereby providing a fluid seal.

Compression spring 55 is inserted between surface 56 of the nipple and surface 57 of a slidable thrust collar surrounding the nipple, said thrust collar having a spherical bearing surface 58 which seats for rotation in a spherical seat in graphite ring 59, similar to ring 54, said rings 54 and 59 being retained within a casing 60, which is held stationary with relation to the screw, by mountings not shown. A pipe 61 leads to the hole 62 in bearing ring 59 and to the passageway 52, which gives access to the passageway 46 in the conveyor screw. The compression spring 55 provides the necessary pressure to seat the spherical surfaces 53 and 58 in their respective graphite seats, so that the pipe 61 may be used to introduce lubricants, under pressure, to the passageway 46 of the conveyor screw, while the conveyor screw is rotating. By such means lubricants may be forced through the branch passageways 49 and 50 and smeared on the cylindrical surface 30 (Fig. 2), at the delivery end of the extrusion cylinder, so that plastic material delivered thereonto will be physically insulated from the said cylindrical surface, and said lubricant will be carried along, by the extruded material, as the extruded material is forced into the funnel-shaped entrance 63 to the orifice 45 which acts as a die to form the extruded body. Such extruded material, due to the lubricant insulation between its surface and the surface of the extruder walls, is free of the surface defects caused by the sticking of said material to the extrusion surfaces.

Referring to Figs. 4, 5 and 6, there is shown a form of the invention which is designed to lubricate the extrusion cylinder delivery surfaces of the extruder and the forming surfaces of a mandrel used in the extrusion of hollow bodies such as tubes. Referring to the said figures, there is shown, like in Figs. 1, 2 and 3, an extrusion machine having a gear housing 65, a jacketed extrusion cylinder housing 66, adapted to control the temperature of extrusion material through liquids circulated through chamber 67 by means of pipes such as pipes 69 and 70, and a cylindrical extrusion chamber having a sleeve 71 provided with an inner cylindrical surface 72 which, at the rear end is open through housing 66 to an inlet or loading pipe 73, through which raw molding material is introduced into the extrusion cylinder sleeve. The extrusion machine also has a delivery head 74 having chamber 75 through which temperature control liquids can be circulated and having coil 76 surrounding it for the same purpose. The delivery head 74 has a cylindrical chamber 77 provided by sleeve 77a, continuous with that of the sleeve 71, said delivery chamber 77 having a delivery surface 78 which forms the external surface of the extruded tubing. Internally of the chamber 77 is held a mandrel 79, in the usual manner by a spider, not shown, the external surface of said mandrel 79 forming the interior surface of the extruded tubing. The conical rearward end 80 (Fig. 5) of the mandrel, projects centrally into a conical countersunk hole 81 in the center of the forward end of the shaft 82 of a conveyor screw which has formed thereon a double threaded spiral flight, comprising flights or threads 83 and 84, the edge surfaces of which are in bearing contact with the surface 72 of the cylindrical sleeve 71 of the extrusion chamber. As in the form of the invention shown in Figs. 1–3, the conveyor screw has keyed to the rear end thereof by key 104 a gear 105 which is driven by a worm 106 to cause the screw to be turned in a manner which will force material delivered to the extrusion chamber through pipe 73, so it will move toward the forward end of the extruder. Various bearings such as bearings 107, 108 and 109 are provided at intervals to give the shaft the proper support while it is being rotated. The shaft 82 has an axial passageway 85, like that shown for the form of the invention which is set out in Figs. 1, 2 and 3, except that at the forward end the passageway branches into branches 86 and 87 having orifices opening, respectively, on the edges of flights or threads 83 and 84 which are in contact with the end of cylindrical sleeve 71, whereby lubricants, forced from the rear end of the screw through passageway 85, may be smeared upon the surface 72 of the sleeve as the screw turns while delivering extruded plastic material. In addition to such branches 86 and 87 are side branches 89 and 90 which extend from passageway 85 to open as orifices on the surface of the conical countersunk hole 81 which is in contact with surface 91 of the mandrel 79 whereby, as the extruder conveyor screw rotates, lubricant also may be smeared upon said mandrel surface 91.

As in that form of the invention shown in Figs. 1-3, the passageway 85 has screwed into the rear end thereof a nipple 95 having the cylindrical surface 96 which rotatably seats in graphite ring 97. A thrust sleeve 98 slips over the end of the nipple, said sleeve 98 having a cylindrical bearing surface 99 which rides in graphite seat 100. Graphite seats 97 and 100 are retained within the joint casing 101, and a compression spring 102 holds surfaces 99 and 96 in contact with the respective graphite seats so that, as the shaft turns, the said elements form a pressure joint which permits lubricant to be introduced through pipe 103, under pressure, to be forced through passageway 85 and out through branch passageways 86, 87, 89 and 90, to smear oil on the surfaces 72 and 91, of the device, which lubricant is carried along by the movement of the extruded plastic, physically insulating said extruded plastic from the die surfaces, including the cylinder and mandrel, preventing the pulsating effect caused by sticking of said material to said surfaces.

It is to be noted that, in each form of the invention, the lubricant is applied in a controlled manner, by rotation of the screw conveyor, so that all parts of the cylindrical surfaces and all parts of the mandrel surfaces which first receive the material as it is delivered from the screw, are covered by a film of lubricant. By the proper control over the amount of lubricant which is caused to move through the passageway 85, the most desirable effect may be produced with respect to the quantity of lubricant, and hence the thickness of the film, that will separate the extruded material from the die delivery surfaces of the extrusion machine.

I am aware that the structures herein described are susceptible of considerable variation without departing from the spirit of my invention, and, therefore, I claim my invention broadly as indicated by the appended claims.

Having thus described my invention, what I claim as new and useful and desire to secure by Letters Patent, is:

1. In an extrusion machine, in combination, an extrusion cylinder having a loading end and a delivery end; and a conveyor screw rotatably mounted in the cylinder with its flight edges in bearing contact with the wall surface of said cylinder for delivering material from the loading end of the cylinder to the delivery end thereof, said screw having a longitudinal passageway therein extending from the loading end to the delivery end, the screw thread of the conveyor being provided with an orifice at its periphery adjacent said delivery end and connected to said passageway for delivering lubricants to the cylinder wall at the delivery end of the screw.

2. In an extrusion machine, in combination, an extrusion cylinder having a loading end and a delivery end; and a conveyor screw rotatably mounted within the cylinder with its flight edges in bearing contact with the wall surface of said cylinder for delivering material from the loading end of the cylinder to the delivery end thereof, said screw having at the delivery end thereof a portion which wipes the cylinder wall at the delivery end, and said screw having a passageway therein extending from the loading end to and ending at said portion which wipes the cylinder wall, for delivery of lubricants to the cylinder wall at the delivery end of the screw.

3. In an extrusion machine, in combination, an extrusion cylinder having a loading end and a delivery end; a conveyor screw rotatably mounted within the cylinder with its flight edges in bearing contact with the wall surface of said cylinder for delivering material from the loading end of the cylinder to the delivery end, said screw having a passageway therein extending from the loading end to and ending at the periphery of the conveyor thread at the delivery end portion of the screw, for delivering lubricants to the cylinder wall at the delivery end of the screw; and means to supply lubricants to the passageway from the loading end of the screw.

4. In an extrusion machine, in combination, an extrusion cylinder having a loading end and a delivery end; a conveyor screw rotatably mounted within the cylinder with its flight edges in bearing contact with the wall surface of said cylinder for delivering material from the loading end of the cylinder to the delivery end, said screw having a passageway therein extending from the loading end to the delivery end and connected to an orifice formed in the periphery of the thread of the conveyor at said delivery end, for delivering lubricants to the cylinder wall at the delivery end of the screw; and means to deliver a lubricant to the passageway at the loading end of the screw, under pressure, without interfering with the rotation of said screw.

5. In an extrusion machine, in combination, an extrusion cylinder having a loading end and a delivery end ending in an extrusion orifice, a conveyor screw rotatably mounted within the cylinder with its flight edges in bearing contact with the wall surface of said cylinder for delivering extrudable material from the loading end of the cylinder to the delivery end thereof, under pressure so as to be extruded from said orifice, said screw having a passageway along its longitudinal axis commencing at the loading end of the screw and continuing towards the delivery end thereof to a point where it branches to the screw edges in wiping engagement with the inside of the cylinder; and means for supplying fluid lubricants through the passageway from the loading end while the screw is being rotated, whereby extrudable material being delivered at the delivery end of the screw will be insulated from the walls of the cylinder and extrusion orifice by means of a lubricant film.

6. In an extrusion machine, in combination, an extrusion cylinder having a loading end and a delivery end; a conveyor screw rotatably mounted within the cylinder for delivering material from the loading end of the cylinder to the delivery end, said screw having its axis of rotation coaxial with the longitudinal axis of the cylinder, and said screw having the edges of the screw surfaces thereof in bearing contact with the walls of the cylinder, whereby extrudable material may be forced to the delivery end under pressure, and said screw having a passageway along its longitudinal axis from the loading end nearly to the delivery end of the screw from where it branches into orifices opening on the periphery of the screw edges at the delivery end of the screw, in wiping relationship to the cylinder walls; and means for delivering oil lubricants to the passageway at the loading end, under pressure, whether or not the screw is rotating, whereby material extruded at the delivery end of the cylinder is protected from contact with the cylinder wall by a film of lubricant.

7. In an extrusion machine, in combination, an extrusion cylinder having a loading end and a delivery end; a multiple flight conveyor screw rotatably mounted within said cylinder so that the edges of the spiral flights thereon are in bearing relationship with the cylinder walls as said screw conveyor is rotated, said screw having a rear end section by which it may be rotated, said screw having an axial passageway having an opening at the rear end and extending toward the delivery end of said screw to branch to delivery orifices on the delivery end of the spiral flights on the wiping surfaces thereof which wipe the delivery end of the cylinder; means to rotate the screw whereby to convey extrudable material from the loading end of the screw to the delivery end thereof; and means coupled with the opening at the rear end of said passageway for delivering fluid lubricants to said passageway, under pressure, while said screw is being rotated, whereby to force lubricants onto said delivery end of the cylinder wall by a smearing action in an equalized manner circumferentially of said delivery end of the cylinder wall.

8. In an extrusion machine, in combination, a cylindrical extrusion chamber, said chamber having a loading end and a delivery end; a screw conveyor having a spiral flight portion of the double screw thread type rotatably mounted in said chamber with its edge in bearing contact with the wall of the chamber, said screw conveyor having a rearwardly extending shaft portion by which it is rotated, and said screw conveyor having a passageway therein extending from an opening on the rear end thereof along the axis of rotation of said screw conveyor to a place just short of the delivery end of said screw conveyor where said passageway branches, one of which ends in an orifice on one of said screw threads, on the wiping surface thereof which is in contact with the cylinder wall, and the other of said branches ending in an orifice on the other of said screw threads at the delivery end thereof which wipes the cylinder walls; means to rotate the screw conveyor so that extrudable materials delivered to it at the loading end will be extruded at the delivery end; and means to deliver fluid lubricants to the rear end of said passageway, under pressure, while said screw conveyor is being rotated, whereby lubricant fluid under pressure is smeared on the delivery end of said cylinder wall in an equalized manner by the rotation of said screw conveyor, so that extruded material will be physically insulated from the said delivery end of the cylinder walls preventing the extruded material from sticking thereto.

9. In an extrusion machine, the combination of a cylindrical extrusion chamber having a loading end and a delivery end ending in an extrusion orifice; a mandrel held centrally within said orifice so as to give an annular shape thereto for the extrusion of tubular material; a screw type conveyor rotatably mounted in said cylindrical chamber, said conveyor having spiral flights thereon the edges of which are in wiping contact with the chamber walls, whereby rotation of said screw conveyor will extrude material delivered thereto at the loading end and force it through said annular orifice, said screw having a rearwardly extending shaft by which it may be rotated, said screw having wiping contact with the rear end of said mandrel, and said screw having an axial passageway therein commencing at an opening in the rear thereof and extending forwardly and axially to a point just short of the delivery end where it branches to end in orifices on the wiping edges of the spiral flights at the delivery end of the screw, and where it branches secondarily to end in orifices opening on the portion of said screw in wiping contact with the mandrel; means to rotate the screw, whereby material furnished to said screw conveyor at the loading end is carried to and extruded at the delivery end thereof; and lubricant supply means coupled to the passageway at the rear end of said screw, whereby lubricants may be delivered under pressure thereto, while said conveyor screw is rotating, so that lubricants will be smeared on the chamber walls at the delivery end of the conveyor screw and onto the receiving end of the mandrel, whereby the extruded material is physically insulated from the shaping surfaces over which it is forced to move.

10. In an extrusion machine, in combination, a cylindrical chamber jacketed for supplying temperature-controlled fluid thereto, said chamber having a loading end and a delivery end, the latter ending in an extrusion orifice; a screw conveyor having a shaft and spiral flights on said shaft, said shaft being mounted axially within said cylindrical chamber and the spiral flights thereon having their edges in bearing contact with the inner surface walls of said chamber, whereby upon rotation of said screw conveyor material fed thereto at the loading end is carried to and extruded at the delivery end thereof, said shaft having an axial passageway beginning at the rear end thereof and ending at the delivery end peripheral surfaces of said screw conveyor which are in wiping contact with the inner walls of said chamber; and means to supply fluid lubricant under pressure to said passageway so that upon rotation of said screw such fluid will be smeared on the delivery end of said chamber walls and carried forward by the extruded material so that said extruded material is physically insulated therefrom to prevent sticking.

11. In an extrusion machine, the combination of, a cylindrical chamber having a loading end and a delivery end ending in an orifice of round cross section; a cylindrical mandrel positioned in said orifice and having a pointed end extending rearwardly, whereby to give said orifice an annular cylindrical opening; a spiral flight type of screw conveyor rotatably mounted in said cylindrical chamber with the edges of the spiral flight thereon in wiping contact with the chamber wall and the front end of said screw having a countersunk portion which engages the pointed end of said mandrel in wiping contact, said screw conveyor having a rearwardly extending shaft whereby it may be turned, and said screw conveyor having a passageway opening at the rear end thereof and extending axially therealong to just short of the delivery of said conveyor screw, said passageway having an opening onto the delivery end of the screw conveyor in wiping contact with the pointed end of the mandrel, whereby upon delivery of lubricant under pressure to the rear end of the passageway, all delivered extruded material is physically insulated from the said mandrel.

WILLIAM H. BONHAM.

REFERENCES CITED

The following references are of record in the file of this patent:

UNITED STATES PATENTS

| Number | Name | Date |
|---|---|---|
| 2,371,060 | Menger et al. | Mar. 6, 1945 |

FOREIGN PATENTS

| Number | Country | Date |
|---|---|---|
| 3,999 | Great Britain | July 25, 1891 |
| 58,128 | Germany | Aug. 8, 1891 |